United States Patent
Shinohara et al.

[11] Patent Number: 5,178,054
[45] Date of Patent: Jan. 12, 1993

[54] TANDEM TYPE VACUUM BOOSTER

[75] Inventors: Takayoshi Shinohara; Chiseki Kaneko, both of Nagano, Japan

[73] Assignee: Nissin Kogyo Kabushiki Kaisha, Ueda, Japan

[21] Appl. No.: 747,836

[22] Filed: Aug. 21, 1991

[30] Foreign Application Priority Data

Aug. 22, 1990 [JP] Japan .................. 2-87800[U]

[51] Int. Cl.$^5$ .................................................. F15B 9/10
[52] U.S. Cl. ...................... 91/376 R; 92/48; 92/99; 91/369.2
[58] Field of Search ............... 91/369.1, 369.2, 376 R; 92/48, 49, 98 R, 99

[56] References Cited

U.S. PATENT DOCUMENTS

| | | | |
|---|---|---|---|
| 4,512,237 | 4/1985 | Endoh et al. | 91/369 A |
| 4,716,814 | 1/1988 | Yamakoshi | 91/376 R |
| 4,718,328 | 1/1988 | Mori et al. | 91/376 R |
| 4,729,289 | 3/1988 | Boehm | 91/376 R |
| 4,787,292 | 11/1988 | Tsuyuki et al. | 92/48 X |
| 4,813,337 | 3/1989 | Endo | 91/376 R X |
| 4,882,980 | 11/1989 | Arino et al. | 92/48 |
| 4,905,573 | 3/1990 | Miyazaki et al. | 92/48 |
| 5,027,695 | 7/1991 | Inoue et al. | 91/369.1 X |
| 5,062,348 | 11/1991 | Gotoh et al. | 91/369.2 |

FOREIGN PATENT DOCUMENTS

| | | |
|---|---|---|
| 2050542 | 1/1981 | United Kingdom . |
| 2058260 | 4/1981 | United Kingdom . |
| 1594168 | 7/1981 | United Kingdom . |
| 2135002 | 8/1984 | United Kingdom . |
| 2243656 | 11/1991 | United Kingdom . |

*Primary Examiner*—Edward K. Look
*Assistant Examiner*—Hoang Nguyen
*Attorney, Agent, or Firm*—Armstrong, Westerman, Hattori, McLeland & Naughton

[57] ABSTRACT

In a tandem type booster, the inner peripheral end of a front booster piston and the inner peripheral bead of a front diaphragm are clamped between a front end of a sleeve fitted over an outer periphery of the piston boss and a flange provided on the piston boss, so that they are connected to a front portion of the piston boss, and a rear booster piston and the piston boss are coupled to each other in a bayonet manner by retaining pawls formed on a inner peripheral end of a rear booster piston and retaining grooves provided in the outer periphery of the piston boss. The rear booster piston, the sleeve and the piston boss are engaged with one another while preventing relative rotation therebetween, and an inner peripheral bead of a rear diaphragm is clamped between the rear booster piston and a set ring and connected to a rear portion of the piston boss. Therefore, even if the set ring should be removed, the rear booster piston and the piston boss coupled to each other in the bayonet manner cannot be immediately separated, thereby ensuring that the coupling of the front and rear booster pistons with the sleeve is maintained.

4 Claims, 6 Drawing Sheets

TANDEM TYPE VACUUM BOOSTER

BACKGROUND OF THE INVENTION

1. Field of the Invention

The field of the present invention is tandem type vacuum boosters for use in a brake device or a clutch device, and more particularly, tandem type vacuum boosters of a type comprising a booster shell including a partition plate mounted therein for partitioning an interior of the booster shell into a front shell chamber and a rear shell chamber, a front booster piston provided to divide the front shell chamber into a fore-side front vacuum chamber and a back-side front working chamber, a front diaphragm overlapped on a rear surface of the front booster piston, a rear booster piston provided to divide the rear shell chamber into a fore-side rear vacuum chamber and a back-side rear working chamber, a rear diaphragm overlapped on a rear surface of the rear booster piston, a piston boss extending through the partition plate and connected to an output rod, the front booster piston and the front diaphragm as well as the rear booster piston and the rear diaphragm being air-tightly connected respectively to front and rear portions of the piston boss, a valve cylinder continuously formed with a rear end of the piston boss and slidably supported by a rear wall of the booster shell, an input rod disposed within the valve cylinder for advancing and retreating movements, and a control valve also disposed within the valve cylinder for placing the two working chambers into alternate communication with the atmosphere and the two vacuum chambers in response to the advancing and retreating movements of the input rod.

2. Description of the Prior Art

Such a tandem type vacuum booster has already been proposed by the present applicant and is known, for example, from U.S. Pat. No. 4,905,573.

In the above tandem type vacuum booster, in order to bind the front and rear booster pistons and the front and rear diaphragms to the piston boss, three components: the piston boss, an end plate of a cylindrical connecting member connected to the front booster piston and overlapped to a front end of the piston boss, and a retaining plate overlapped to a rear end of the piston boss are coupled to one another by a plurality of through-bolts, thereby fixing the front booster piston and the front diaphragm between the end plate and the front end of the piston boss and fixing the rear booster piston and the rear diaphragm between the retaining plate and the rear end of the piston boss.

In the above prior art tandem type vacuum booster, however, there is a problem that it is necessary to pass the plurality of through-bolts through the piston boss, the end plate and the retaining plate and tighten them, resulting not only in an increased number of parts but also in such labor and time required for assembling the parts.

Thereupon, there are tandem type vacuum boosters known from U.S. Pat. Nos. 4,716,814 and 4,718,328, wherein a sleeve is fitted over an outer periphery of a piston boss and retained at its front end by a nut, and front rear booster pistons and front and rear diaphragms are air-tightly fixed to front and rear portions of the piston boss through the sleeve, respectively, thereby providing an improvement in assembling property with the conventionally used through-bolts eliminated.

With the above construction, however, if the nut should be removed from the piston boss, the sleeve may be moved axially, resulting in a fear that the front and rear booster pistons and the front and rear diaphragms are separated from the piston boss to impair the function of the vacuum booster.

SUMMARY OF THE INVENTION

Accordingly, it is an object of the present invention to provide a tandem type vacuum booster wherein even if a stopper member for retaining the sleeve which couples the front and rear booster pistons and the front and rear diaphragms to the piston boss is removed, the function of the vacuum booster can be maintained.

To achieve the above object, according to the present invention, there is provided a tandem type vacuum booster comprising: a booster shell having a partition plate mounted therein for partitioning an interior of the booster shell into a front shell chamber and a rear shell chamber; a front booster piston provided to divide the front shell chamber into a fore-side front vacuum chamber and a back-side front working chamber; a front diaphragm overlapped on a rear surface of the front booster piston; a rear booster piston provided to divide the rear shell chamber into a fore-side rear vacuum chamber and a back-side rear working chamber; a rear diaphragm overlapped on a rear surface of the rear booster piston; a piston boss extending through the partition plate and connected to an output rod, the front booster piston and the front diaphragm as well as the rear booster piston and the rear diaphragm being air-tightly connected respectively to front and rear portions of the piston boss through a sleeve which is fitted over an outer periphery of the piston boss and retained at a rear end thereof by a stopper member; a valve cylinder continuously formed with a rear end of the piston boss and slidably supported in a rear wall of the booster shell; an input rod disposed within the valve cylinder for advancing and retreating movements; a control valve also disposed within the valve cylinder for placing the working chambers into alternate communication with an atmosphere and the respective vacuum chambers in response to advancing and retreating movements of the input rod, wherein the front booster piston and the front diaphragm are connected to the front portion of the piston boss by clamping an inner peripheral end of the front booster piston and an inner peripheral bead of the front diaphragm between a front end of the sleeve and a flange provided on the piston boss, and wherein the rear booster piston and the rear diaphragm are connected to the rear portion of the piston boss by coupling an inner periphery of the rear booster piston and an outer periphery of the piston boss to each other in a bayonet manner and by engaging the rear booster piston and the piston boss with each other for preventing a relative rotation therebetween and clamping an inner peripheral bead of the rear diaphragm between the rear booster piston and the stopper member.

With the above construction, even if the stopper member is removed from the piston boss for any reason, slipping-out of the rear booster piston is restrained, because the rear booster piston and the piston boss are coupled to each other in the bayonet manner and moreover, the relative rotation therebetween is restrained. As a result, the axial movement of the sleeve is restrained by the rear booster piston, so that the booster piston and the front diaphragm clamped between the flange of the piston boss and the sleeve are prevented from being immediately removed. This ensures that even after removal of the stopper member, the boosting function provided by the front vacuum chamber and the front working chamber is maintained, leading to an increased reliability of the vacuum booster.

If the rear booster piston and the piston boss are coupled to each other in a bayonet manner by a retaining pawl formed on the inner periphery of the rear booster piston and a retaining groove provided in the outer periphery of the piston boss, such bayonet coupling can be easily and reliably achieved.

If the rear booster piston, the sleeve and the piston boss are engaged with one another against relative rotation therebetween by engaging a groove provided in the sleeve with a projection formed on the rear booster piston and by engaging a projection formed on the sleeve with a groove provided in the piston boss, any breakaway of the bayonet coupling can be reliably prevented.

The booster is further arranged to include a first port permitting the front and rear working chambers to communicate with the control valve, and a second port permitting the front and rear vacuum chambers to communicate with the control valve, the first and second ports passing through a junction between the piston boss and the sleeve, and a single annular sealing member being located on a junction surface extending between the first and second ports. According to this arrangement, not only the ports can be made easily by utilizing the junction between the piston boss and the sleeve, but also communication between both the ports can be positively inhibited by the single annular sealing member.

The above and other objects, features and advantages of the invention will become apparent from the following description of the preferred embodiment, taken in conjunction with the accompanying drawings.

DESCRIPTION OF THE PREFERRED EMBODIMENTS

The present invention will now be described by way of one embodiment in connection with the accompanying drawings.

Figure 1:
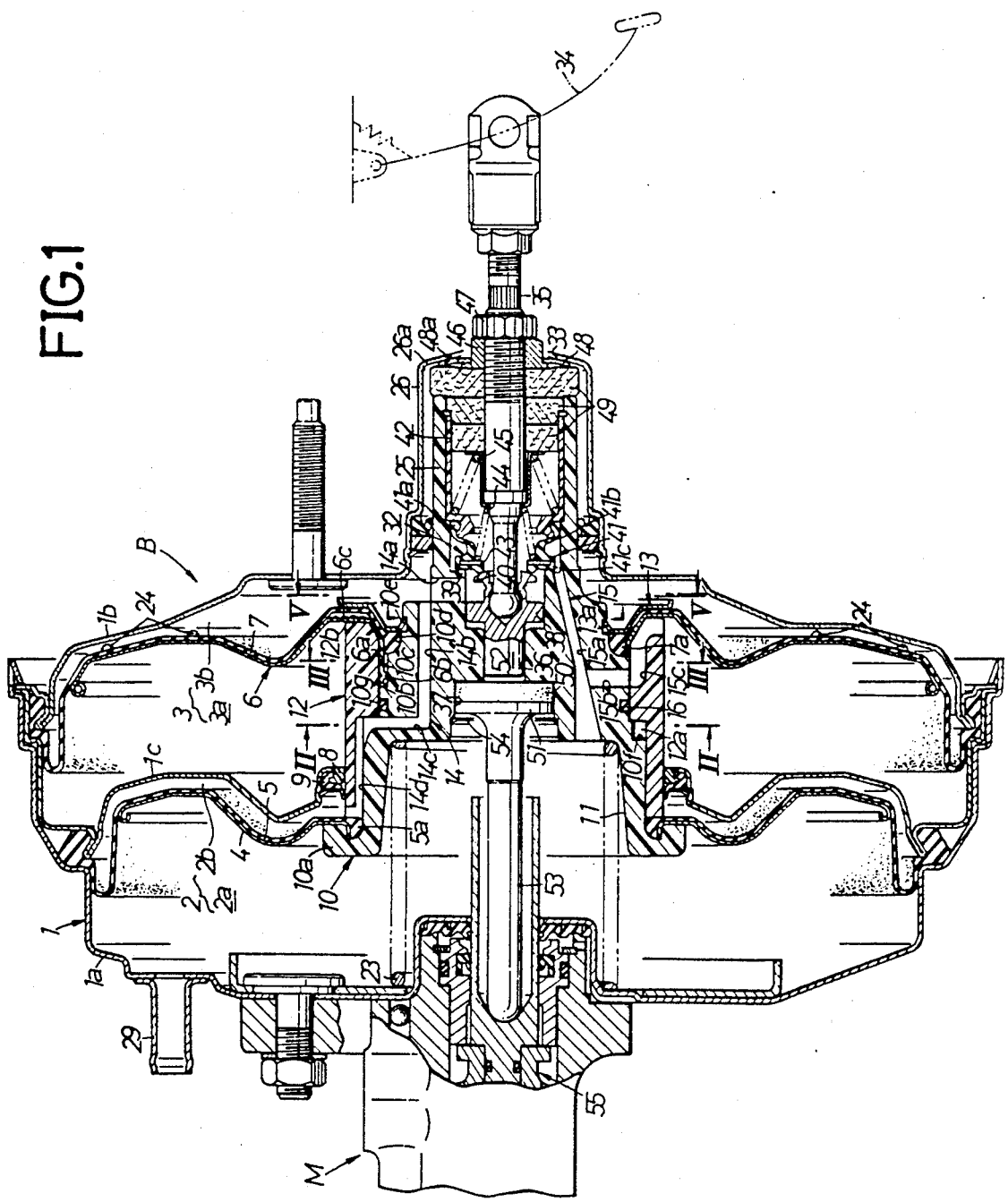
FIG. 1 is a longitudinal sectional side view of a tandem type vacuum booster which is in a resting condition.

Referring to FIG. 1, a brake master cylinder M is connected to a front surface of a booster shell 1 of a tandem type vacuum booster B and is operated by the booster B.

The booster shell 1 is comprised of a pair of front and rear shell halves 1a and 1b coupled at their opposed ends to each other, and a partition plate 1c clamped between the shell halves 1a and 1b to partition an interior of the booster shell 1 into a front shell chamber 2 and rear shell chamber 3. The rear shell half 1b is supported on a vehicle body which is not shown.

The front shell chamber 2 is divided into a fore-side front vacuum chamber 2a and a back-side front working chamber 2b by cooperation of a front booster piston 4 received in the front shell chamber 2 for longitudinally reciprocal movement and a front diaphragm 5 overlapped and coupled to a rear surface of the front booster piston 4. The diaphragm 5 is clamped between the front shell half 1a and the partition plate 1c. The rear shell chamber 3 is also divided into a fore-side rear vacuum chamber 3a and a back-side rear working chamber 3b by cooperation of a rear booster piston 6 received in the rear shell chamber 3 for longitudinally reciprocal movement and a rear diaphragm 7 overlapped and coupled to a rear surface of the rear booster piston 6. The diaphragm 7 is secured between the shell halves 1a and 1b together with the partition plate 1c.

The front and rear booster pistons 4 and 6 each made annularly from steel a sheet are coupled to front and rear ends of a piston boss 10 made of synthetic resin, respectively. A sleeve 12 is fitted over an outer periphery of the piston boss 10 to lie between the booster pistons 4 and 6. The sleeve 12 is slidably carried by the partition plate 1c with a bush 8 and a sealing member 9 interposed therebetween.

More specifically, the piston boss 10 includes a circular recess 11 provided at its front face and having a depth amounting to substantially half of the length of the boss 10, and a flange 10a projecting at a peripheral edge of an opening of the circular recess 11. An inner peripheral end of the front booster piston 4 and an inner peripheral bead 5a of the front diaphragm 5 are engaged, in an overlapped relation, with the flange 10a. The cylindrical sleeve 12 is set on the piston boss 10 from the rear, until a front end thereof abuts against a rear surface of the inner peripheral bead 5a. The front booster piston 4 and the front diaphragm 5 are clamped between the flange 10a and the sleeve 12 and thereby secured firmly to a front portion of the piston boss 10.

Figure 3:
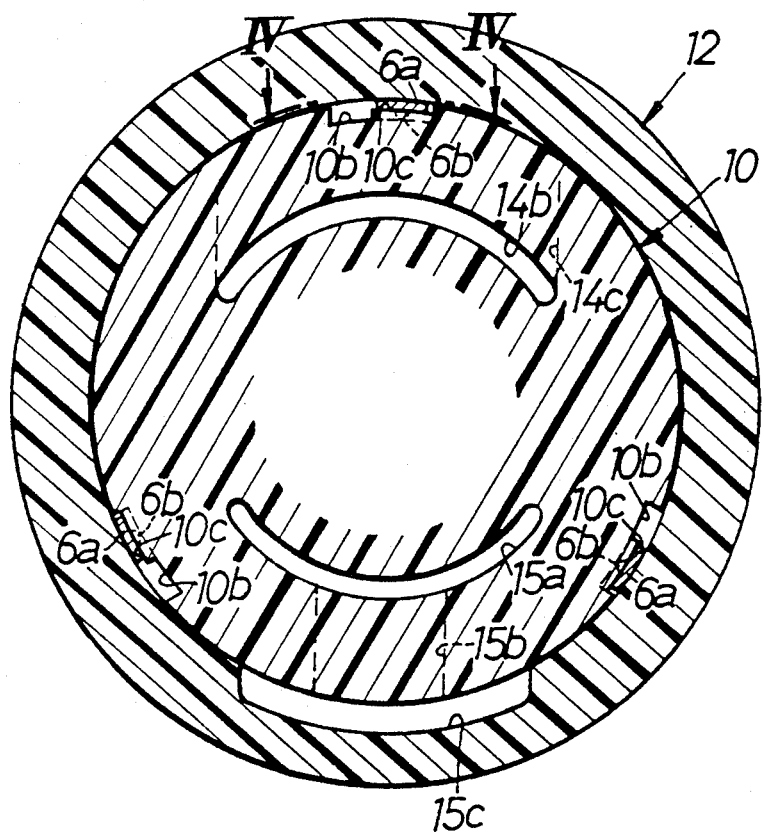
Figure 4:
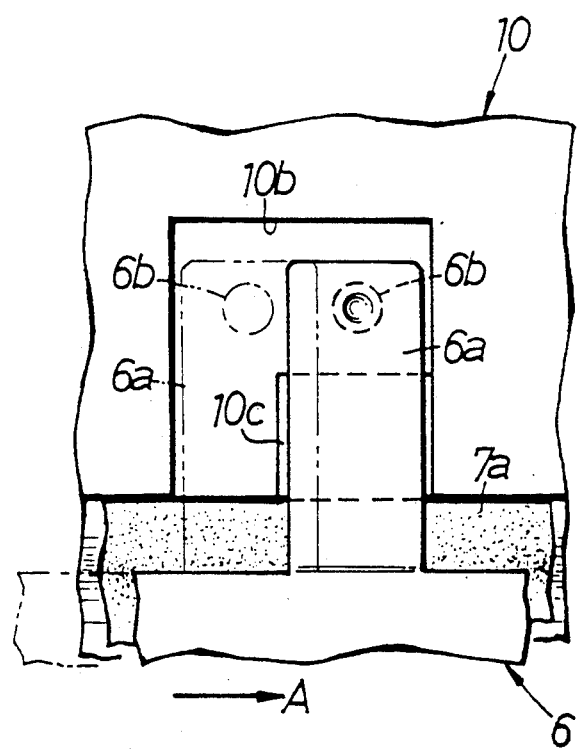
FIG. 4 is a view taken along an arrow IV—IV in FIG. 3.

As can be seen from reference to FIGS. 3 and 4, three L-shaped retaining grooves 10b are provided in an outer periphery of a rear portion of the piston boss 10. The retaining groove 10b is comprised of an axially extending guide portion and a hook portion bent at a right angle from a terminal end of the guide portion and extending circumferentially. A clearance groove 10c is formed circumferentially adjacent the guide portion with a depth smaller than that of the retaining groove 10b and connected to the guide portion and the hook portion. On the other hand, three retaining pawls 6a are provided on an inner peripheral end of the rear booster piston 6 to extend axially forwardly, and an inwardly protruding projection 6b is formed on each of the retaining pawls 6a. A known bayonet mechanism is constructed by the retaining grooves 10b and the retaining pawls 6a.

Figure 2:
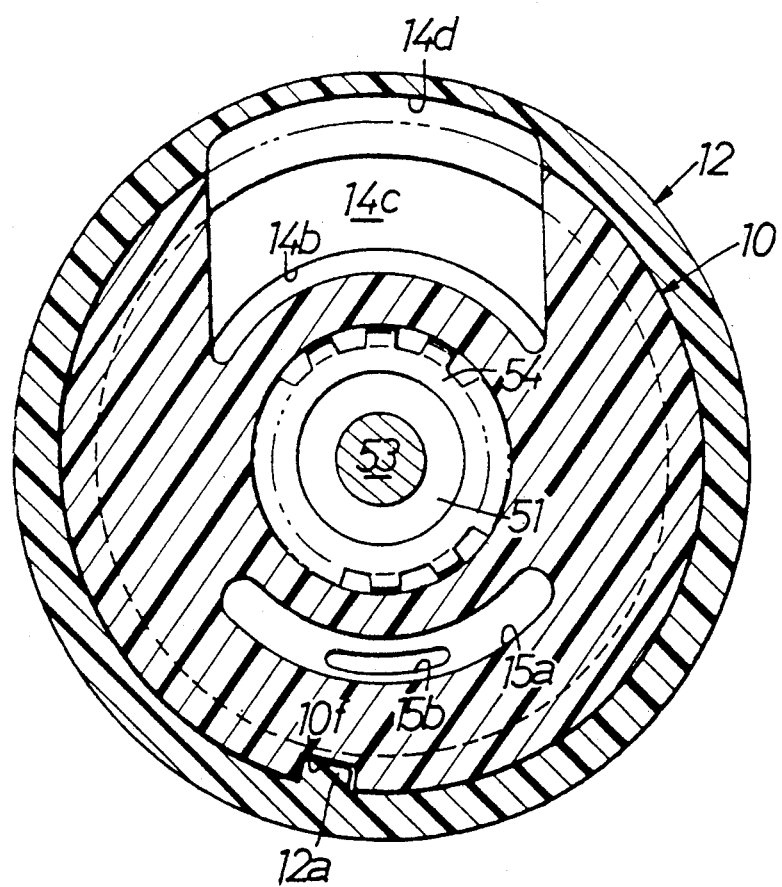
FIGS. 2 and 3 are sectional views taken along lines II—II and III—III in FIG. 1, respectively.
Figure 5:
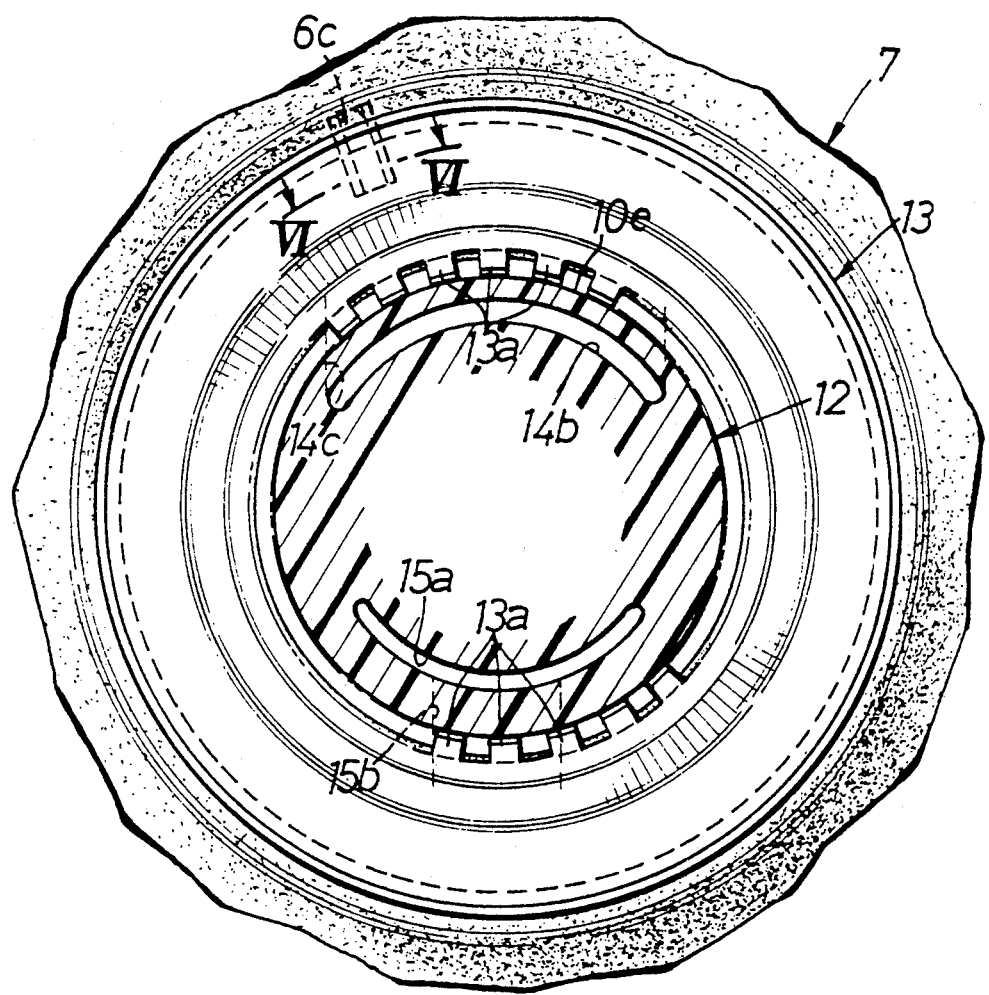
FIG. 5 is a sectional view taken along a line V—V in FIG. 1.
Figure 6:
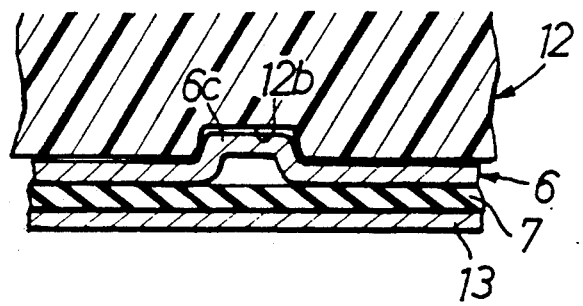
FIG. 6 is a sectional view taken along line VI—VI in FIG. 5.

After the rear booster piston 6 is connected to the piston boss 10 in this manner, the inner peripheral bead 7a of the rear diaphragm 7 overlapped on the rear surface of the rear booster piston 6 is set to engage with a step 10d formed on the piston boss 10. Then the diaphragm 7 is retained by a set ring 13 serving as a stopper member. More specifically, the set ring 13 is retained by engagement of a large number of pawls 13a provided on an inner periphery of the set ring 13 into an annular groove 10e provided in the rear end of the piston boss 10. The rear booster piston 6 and the rear diaphragm 7 are firmly retained to the rear portion of the piston boss 20 by such set ring 13, and the axial movement of the sleeve 12 fitted over the piston boss 10 is restrained. As can be seen from FIGS. 1 and 2, with the set ring 13 mounted, a projection 12a axially formed on an inner periphery of the sleeve 12 engages a groove 10f axially provided in an outer periphery of the piston boss 10, whereby the sleeve 12 is coupled to the piston boss 10 against relative rotation therebetween. It can be seen from FIGS. 1, 5 and 6 that a projection 6c provided on a front surface of the rear booster piston 6 engages in a groove 12b radially provided in a rear end of the sleeve 12. As a result, the rear booster piston 6 and the piston boss 10 are coupled to each other through the sleeve 12 while preventing relative rotation therebetween, so that the coupling provided by the bayonet mechanism is prevented from being released.

A first port 14 is provided in the piston boss 10 to permit the front and rear working chambers 2b and 3b to be put into communication with the atmosphere through a control valve 32 which will be described hereinafter. As can be seen from FIGS. 2 and 3, the first port 14 is comprised of a passage 14a extending radially through the rear end portion of the piston boss 10 to permit a communication between the rear working chamber 3b and the control valve 32, a passage 14b having an arcuate cross section and extending axially in the piston boss 10, a passage 14c rising radially outwardly from the front end of the passage 14b, and a passage 14d defined by cooperation of a groove made in an inner surface of the sleeve 12 and the outer periphery of the piston boss 10 to communicate with the front working chamber 2b. A second port 15 is provided to permit the front and rear working chambers 2b and 3b to be put into communication with the front and rear vacuum chambers 2a and 3a through the first port 14 and the control valve 32. The second part 15 is comprised of a passage 15a having an arcuate cross section and extending axially through the interior of the piston boss 10 to connect the control valve 32 with the front vacuum chamber 2a, a passage 15b rising radially outwardly from the passage 15a, and a passage 15c defined between a groove provided in the inner surface and the rear end of the sleeve 12 and the front surface of the rear booster piston 6 to permit a communication between the passage 15b and a rearmost portion of the rear vacuum chamber 3a. In this case, an alignment of the piston boss 10 with the sleeve 12 in a rotational direction is effected by the projection 10d and the groove 12b in order to provide an alignment between the first and second ports 14 and 15 in the piston boss 10 and the sleeve 12. Contacts surfaces of the outer periphery of the piston boss 10 and the inner periphery of the sleeve 12 are sealed by an O-ring 16 mounted in a sealing groove 10g provided in the outer periphery of the piston boss 10. Thus, the first port 14 communicating with the front working chamber 2b is reliably cut off from the front and rear vacuum chambers 2a and 3a by the inner peripheral bead 5a of the front diaphragm 5 and the O-ring 16, and the second port 15 communicating with both the vacuum chambers 2a and 3a is reliably cut off from the rear and front working chambers 3b and 2b by the inner peripheral bead 7a of the rear diaphragm 7 and the O-ring 16.

A return spring 23 is mounted in a compressed manner between an outer periphery of the circular recess 11 provided at the front end of the piston boss 10 and the front shell half 1a, so that the piston boss 10 and thus the booster pistons 4 and 6 are normally biased in a retreat direction by a spring force of the return spring 23. A retreat limit for the booster pistons 4 and 6 are provided by abutment of a large number of projections 24 raised on the rear surface of the rear diaphragm 6 against a rear wall of the booster shell 1.

The front vacuum chamber 2a is connected to a vacuum pressure source (not shown) (e.g., of intake manifold in an internal combustion engine) through a vacuum pressure intake pipe 29 and communicates with the rear vacuum chamber 3a via the second port 15 made in the piston boss 10. The front and rear working chambers 2b and 3b communicate with each other via the first port 14 made in the piston boss 10 and adapted to be put into alternate communication with the front and rear vacuum chambers 2a and 3a and an atmospheric air intake port 33 opened at an end wall 26a of a rearwardly extended cylindrical 26 continuously formed with the rear end of the booster shell 1.

An input rod 35 connected to a brake pedal 34 and the control valve 32 controlled by the input rod 35 are mounted in the following manner within a valve cylinder 25 connected to the rear portion of the piston boss 10. That is, a valve piston 38 is slidably received in a front portion of the valve cylinder 25, and the input rod 35 extending through the atmospheric air intake port 33 is oscillatably coupled to the valve piston 38. A first annular valve seat 39 is provided on an inner peripheral surface of the valve cylinder 25, and a second annular valve seat 40 is formed on a rear end face of the valve piston 38 and is surrounded by the first valve seat 39. A valve member 41 is disposed within the valve cylinder 25 to cooperate with the valve seats 39 and 40. The valve member 41 is made of rubber and is cylindrical with opposite front and rear ends opened. The rear or base end 41a of the valve member 41 is kept in close contact with the inner peripheral surface of the valve cylinder 25 by a cylindrical retainer 42 fitted into the valve cylinder 25. The valve member 41 includes a flexible portion 41b having a small wall thickness and bent radially inwardly from the base end 41a, and a valve portion 41c having a large wall thickness and connected to a front end of the flexible portion 41b. The valve portion 41c is disposed in an opposed relation to the first and second valve seats 39 and 40. The valve portion 41c is movable longitudinally by deformation of the flexible portion 41b, so that it is seated on the first and second valve seats 39 and 40 when advancing and received on a front end of the cylindrical retainer 42 when retreating.

An annular reinforcing plate 43 is embedded in the valve portion 41c, and a valve spring 44 is mounted in a compressed manner between the reinforcing plate 43 and the input rod 35 for biasing the valve portion 41c toward the both the valve seats 39 and 40. One end of the second port 15 is opened into the inner surface of the valve cylinder 25 outside the first valve seat 39, and one end of the first port 14 is opened into the inner surface of the valve cylinder 25 inside the first valve seat 39. A space inside the second valve seat 40 communicates with the atmospheric air intake port 33 via hollows of the valve member 41 and the cylindrical retainer 42. The control valve 32 is comprised of the valve member 41, the valve spring 44, and the first and second valve seats 39 and 40.

A return spring 45 is mounted in a compressed manner between the input rod 35 and the cylindrical retainer 42 for biasing the input rod 35 toward its retreat limit. The retreat limit of the input rod 35 is provided by abutment of a stopper plate 46 screwed over the input rod 35 for adjustably advancing and retreating movements against the inner surface of the end wall 26a of the rearwardly extended cylinder 26 through a washer 48. Therefore, if the stopper 46 is rotated, the screwed position of the stopper plate 46 over the input rod 35 is changed and hence, the retreat limit of the input rod 35 can be adjusted longitudinally. The fixing of the stopper plate 46 after such adjustment may be achieved by tightening a lock nut 47 which is likewise screwed over the input rod 35. A communication hole 48a is provided in the washer 48, so that the atmospheric air intake port 33 is not occluded by the washer 48.

An air filter 49 is mounted to surround the input rod 35 for filtering air introduced into the valve cylinder 25 through the atmospheric air intake port 33. The air filter 49 has a moderate softness, so that the relative displacement between the input rod 35 and the valve cylinder 25 is not hindered.

The piston boss 10 is provided with a large diameter cylinder bore 37 opened into a central portion of the front surface of the boss 10, and a small diameter cylinder bore 36 opened at its opposite ends into the large diameter cylinder bore 37 and the valve cylinder 25. A reaction piston 52, which is either integral with the valve piston 38 separate from the valve piston 38 to abut against the vale piston 38, is slidably received in the small diameter cylinder bore 36. And a resilient piston 50 opposed to the reaction piston 52 and an output piston 51 overlapped on a front surface of the resilient piston 50 are slidably received in the large diameter cylinder bore 37. In order to prevent the output piston 51 from being slipped out of the large diameter cylinder bore 37, a set ring 54 is mounted in an opening of the large diameter cylinder bore 37.

An output rod 53 is provided projectingly on a front surface of the output piston 51 and connected to a piston 55 in the brake master cylinder M.

The operation of this embodiment will be described below. First, when the vacuum booster B is in a resting condition, the input rod 35 is located at the retreat limit, and the control valve 32 is in a neutral state in which the valve portion 41c is seated on the first and second valve seats 39 and 40 to put the front and rear working chambers 2b and 3b out of communication with both of the vacuum chambers 2a and 3a and the atmospheric air intake port 33, as shown in FIG. 1. The control valve 32 in such a state ensures that a vacuum pressure supplied from the vacuum pressure source through the vacuum pressure intake pipe 29 is stored in the vacuum chambers 2a and 3a, and a vacuum pressure diluted properly with the atmospheric air is maintained in the working chambers 2b and 3b. Thus, a slight advancing force is applied to each of the front and rear booster pistons 4 and 6 due to a difference in pressure each developed between the front vacuum chamber 2a and the working chamber 2b and between the rear vacuum chamber 3a and the working chamber 3b. But such advancing forces are balanced with the resilient force of the return spring 23 and thus, the booster pistons 4 and 6 are kept at locations where they are advanced slightly from their retreat limits.

Figure 7:
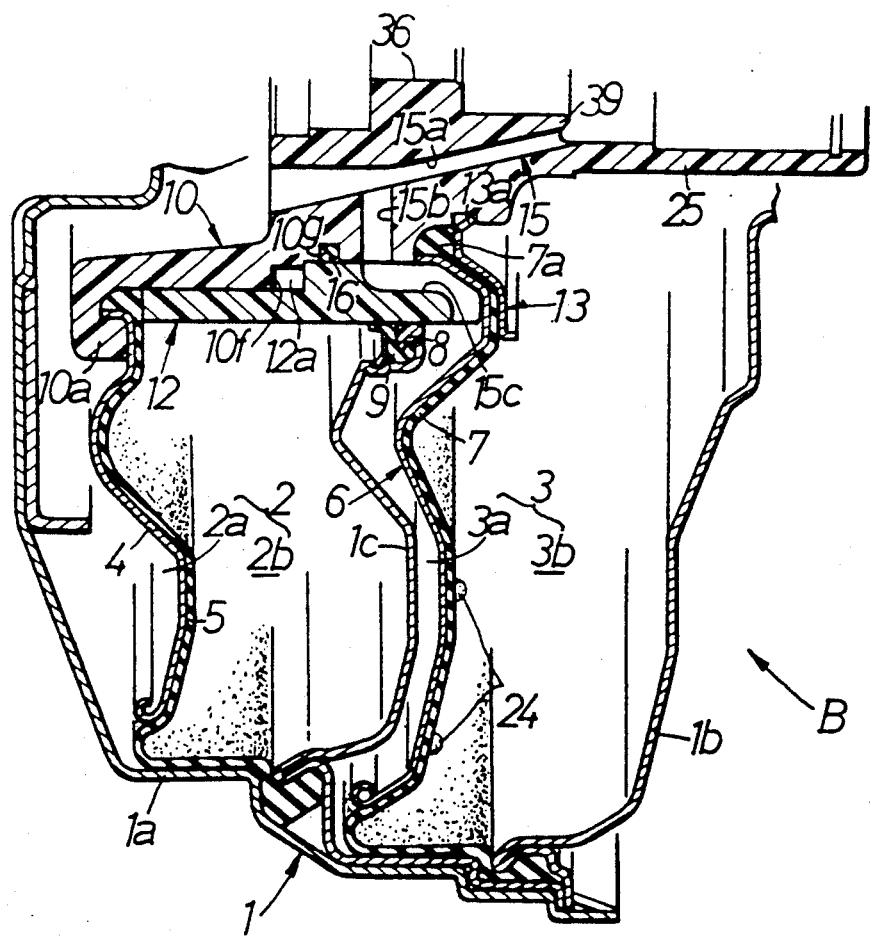
FIG. 7 is a partially longitudinal sectional view of the vacuum booster which is in operation.

If the brake pedal 34 is now depressed to advance the input rod 35 and the piston 38 in order to brake the vehicle, the second valve seat 40 is immediately separated away from the valve portion 41c to put the working chambers 2b and 3b into communication with the atmospheric air intake port 33, because the booster pistons 4 and 6 are stationary at the beginning. As a result, the atmospheric air is introduced quickly into the working chambers 2b and 3b through the atmospheric air intake port 33 via the second valve seat 40 and the first port 14, so that the pressure in the chambers 2b and 3b are brought into a level higher than that in the vacuum chambers 2a and 3a. Therefore, as shown in FIG. 7, the booster pistons 4 and 6 get a larger advancing force based on such a difference in pressure and advance with a good response against the force of the return spring 23, thereby driving the piston 55 of the brake master cylinder M forwardly through the output rod 53. In this manner, the brake master cylinder M can be operated without any retard from the depression of the brake pedal 34 to brake the vehicle. Moreover, the passage 15c of the second port 15 made in the piston boss 10 is opened at the rear end of the rear vacuum chamber 3a and hence, it is possible to insure a sufficient stroke of the piston boss 10 and thus the piston 55.

During such a braking, the valve piston 38 is also advanced together with the input rod 35 to abut against the resilient piston 50 through the reaction piston 52. However, the resilient piston 50 is deformed and expanded toward the small diameter cylinder bore 36 upon reception of a reaction force from the operation of the booster pistons 4 and 6, thereby applying such reaction force partially to the reaction piston 52. This partial force is fed back to the brake pedal 34 through the valve piston 38 and the input rod 35. By such a reaction effect, the driver can sense the magnitude of an output from the output rod 53, i.e., a braking force.

If the output from the output rod 53 exceeds a boosting limit point due to an increase in depression force to the brake pedal 34, i.e., due to an increase in input from the input rod 35, a front surface of the valve piston 38 abuts against the piston boss 10, so that the entire input is transmitted to the output rod 53 via the valve piston 38, the piston boss 10, the resilient piston 50 and the output piston 51 ultimately, a sum of the advancing force of the booster pistons 4 and 6 due to a difference in pressure and the advancing force due to the input is output from the output rod 53.

If the depression force to the brake pedal 34 is then released, the input rod 35 is first retreated along with the valve piston 38 by the resilient force of the return spring 45, thereby allowing the second valve seat 40 to be seated on the valve portion 41c of the valve member 41, while allowing the valve portion 41c to be separated greatly away from the first valve seat 39, so that both the working chambers 2b and 3b are put into communication with the vacuum chambers 2a and 3a to immediately eliminate the difference in pressure across each of the booster piston 4 and 6. Thus, the booster pistons 4 and 6 are retreated by the resilient force of the return spring 23 to release the operation of the brake master cylinder M. When the input rod 35 reaches its retreat limit at which the stopper plate 46 abuts against the partition wall 26a of the rearwardly extended cylinder 26, the rear booster piston 6 is returned to its retreat limit at which the projections 24 of the rear diaphragm 7 abut against the rear wall of the booster shell 1, thereby allowing the first valve seat 39 to be seated on the valve portion 41c, while allowing the valve portion 41c to be separated slightly away from the second valve seat 40, so that the atmospheric air is introduced again into the working chambers 2b and 3b. Then the booster pistons 4 and 6 are advanced slightly due to a difference in pressure developed by the introduction of the air so that a small gap between the second valve seat 40 and the valve portion 41c is eliminated to bring the control valve 32 into the initial neutral state. In this manner, the vacuum pressure diluted with the atmospheric air is maintained in the working chambers 2b and 3b, and the vacuum booster B is brought into a resting state as shown in FIG. 1.

To connect the front and rear booster pistons 4 and 6 and the front and rear diaphragms 5 and 7 to the piston boss 10 in such tandem type vacuum booster B, the inner peripheral end of the front booster piston 4 and the inner peripheral bead 5a of the front diaphragm 5 are first set at the flange 10a of the piston boss 10 from the rear, and then, placing the sleeve 12 from the rear until it clamps the front booster piston 4 and the front diaphragm 5 between itself and the flange 10a. In this situation, the relative rotation between the sleeve 12 and the piston boss 10 is prevented by engagement of projection 12a formed on the sleeve 12 with the groove 10f provided in the piston boss 10. In placing the sleeve 12 from the rear, the sealing member 9 mounted in the partition plate 1c is bent forwardly, i.e., toward the inside of the front working chamber 2b by the front end of the sleeve 12, thereby effectively preventing any leakage of the pressure out of the high pressure front working chamber 2b into the low pressure rear vacuum chamber 3a.

Then, the rear booster piston 6 is rotated in a direction of an arrow A in FIG. 4 after the retaining pawls 6a of the rear booster piston 6 has been inserted axially into the guide portions of the retaining grooves 10b in the piston boss 10. The base portions of the retaining pawls 6a are overlapped on upper surfaces of the clearance grooves 10c, and the retaining projections 6b formed at the tip ends of the retaining pawls 6a enter the hook portions of the retaining grooves 10b. Even if the rear booster piston 6 is intended to be withdrawn rearwardly from this state, the separation of the rear booster piston 6 and the piston boss 10 is prevented, because the retaining projections 6b of the retaining pawls 6a are in engaged in the retaining grooves 10b.

Subsequently, the inner peripheral bead 7a of the rear diaphragm 7 is fitted on the step 10d of the piston boss 10 from the rear and then, the set ring 13 is mounted at the rear portion thereof, thereby causing the rear booster piston 6 and the rear diaphragm 7 to be clamped between the rear end of the sleeve 12 and the set ring 13. The rear booster piston 6 and the piston boss 10 are coupled to each other through the sleeve 12 while preventing relative rotation therebetween by engagement of the projection 6c provided on the front surface of the rear booster piston 6 with the groove 12b provided in the sleeve 12. As a result, the rear booster piston 6 and the piston boss 10 coupled in a bayonet manner are prevented from being separated from each other.

Even if the set ring 13 is slipped out of the annular groove 10e in the piston boss 10 due to any cause, the rear piston 6 and the piston boss 10 coupled in the bayonet manner cannot be immediately separated from each other and hence, the axial movement of the sleeve 12 abutting against the rear booster piston 6 is restrained. As a result, the front booster piston 4 can be also retained on the piston boss 10, thereby permitting the booster function to be maintained.

What is claimed is:

1. A tandem type vacuum booster comprising:
   a booster shell having a partition plate mounted therein for partitioning an interior of the booster shell into a front shell chamber and a rear shell chamber;
   a front booster piston provided to divide the front shell chamber into a fore-side front vacuum chamber and a back-side front working chamber;
   a front diaphragm overlapping on a rear surface of the front booster piston;
   a rear booster piston provided to divide the rear shell chamber into a fore-side rear vacuum chamber and a back-side rear working chamber;
   a rear diaphragm overlapped on a rear surface of the rear booster piston;
   a piston boss extending through the partition plate and connected to an output rod, said piston boss provided with a flange on a front portion thereof;
   a valve cylinder continuously formed with a rear end of the piston boss and slidably supported by a rear wall of the booster shell;
   an input rod disposed within the valve cylinder for advancing and retreating movements;
   a control valve also disposed within the valve cylinder for placing the working chambers into alternate communication with an atmosphere and the respective vacuum chambers in response to advancing and retreating movements of the input rod;
   a sleeve fitted over an outer periphery of the piston boss;
   a front end of the sleeve and the flange clamping an inner peripheral end of the front booster piston and an inner peripheral bead of the front diaphragm, thereby air-tightly connecting the front booster piston and the front diaphragm to the front portion of the piston boss;
   a bayonet means provided between the rear booster piston and the piston boss for coupling the rear booster piston to the piston boss, with the rear booster piston abutting against a rear end of the sleeve;
   an engaging means provided between the rear booster piston and the piston boss for preventing a relative circumferential rotation between the rear booster piston and the piston boss in a condition where the bayonet means couples the rear booster piston to the piston boss; and
   a stopper member connected to the piston boss for clamping an inner peripheral bead of the rear diaphragm between the stopper member and the piston boss, thereby air-tightly connecting the rear booster piston and the rear diaphragm to a rear portion of the piston boss.

2. A tandem type vacuum booster comprising:
   a booster shell having a partition plate mounted therein for partitioning an interior of the booster shell into a front shell chamber and a rear shell chamber;
   a front booster piston provided to divide the front shell chamber into a fore-side front vacuum chamber and a back-side front working chamber;
   a front diaphragm overlapped on a rear surface of the front booster piston;
   a rear booster piston provided to divide the rear shell chamber into a fore-side rear vacuum chamber and a back-side rear working chamber;
   a rear diaphragm overlapped on a rear surface of the rear booster piston;

a piston boss extending through the partition plate and connected to an output rod, said piston boss provided with a flange on a front portion thereof;

a valve cylinder continuously formed with a rear end of the piston boss and slidably supported by a rear wall of the booster shell;

an input rod disposed within the valve cylinder for advancing and retreating movements;

a control valve also disposed within the valve cylinder for placing the working chambers into alternate communication with an atmosphere and the respective vacuum chambers in response to advancing and retreating movements of the input rod;

a sleeve fitted over an outer periphery of the piston boss;

a front end of the sleeve and the flange clamping an inner peripheral end of the front booster piston and an inner peripheral bead of the front diaphragm, thereby air-tightly connecting the front booster piston and the front diaphragm to the front portion of the piston boss;

a retaining pawl formed on an inner periphery of the rear booster piston;

a retaining groove formed on an outer periphery of the piston boss;

said retaining pawl and said retaining groove cooperating to couple the rear booster piston to the piston boss in a bayonet manner, with the rear booster piston abutting against a rear end of the sleeve;

an engaging means provided between the rear booster piston and the piston boss for preventing a relative circumferential rotation between the rear booster piston and the piston boss in a condition where the rear booster piston is coupled to the piston boss in a bayonet manner; and a stopper member connected to the piston boss for clamping an inner peripheral bead of the rear diaphragm between the stopper member and the piston boss, thereby air-tightly connecting the rear booster piston and the rear diaphragm to a rear portion of the piston boss.

3. A tandem type vacuum booster comprising:

a booster shell having a partition plate mounted therein for partitioning an interior of the booster shell into a front shell chamber and a rear shell chamber;

a front booster piston provided to divide the front shell chamber into a fore-side front vacuum chamber and a back-side front working chamber;

a front diaphragm overlapped on a rear surface of the front booster piston;

a rear booster piston provided to divide the rear shell chamber into a fore-side rear vacuum chamber and a back-side rear working chamber;

a rear diaphragm overlapped on a rear surface of the rear booster piston;

a piston boss extending through the partition plate and connected to an output rod, said piston boss provided with a flange on a front portion thereof;

a valve cylinder continuously formed with a rear end of the piston boss and slidably supported by a rear wall of the booster shell;

an input rod disposed within the valve cylinder for advancing and retreating movements;

a control valve also disposed within the valve cylinder for placing the working chambers into alternate communication with an atmosphere and the respective vacuum chambers in response to advancing and retreating movements of the input rod;

a sleeve fitted over an outer periphery of the piston boss;

a front end of the sleeve and the flange clamping an inner peripheral end of the front booster piston and an inner peripheral bead of the front diaphragm, thereby air-tightly connecting the front booster piston and the front diaphragm to the front portion of the piston boss;

a bayonet means provided between the rear booster piston and the piston boss for coupling the rear booster piston to the piston boss, with the rear booster piston abutting against a rear end of the sleeve;

an engaging means provided between the rear booster piston and the piston boss for preventing a relative circumferential rotation between the booster piston and the piston boss in a condition where the bayonet means couples the rear booster piston to the piston boss;

said engaging means including a projection formed on one of the rear booster piston and the sleeve for engaging a groove provided in the other of the rear booster piston and the sleeve, and a projection formed on one of the sleeve and the piston boss for engaging a groove provided in the other of the sleeve and the piston boss; and a stopper member connected to the piston boss for clamping an inner peripheral bead of the rear diaphragm between the stopper member itself and the piston boss, thereby air-tightly connecting the rear booster piston and the rear diaphragm to a rear portion of the piston boss.

4. A tandem type vacuum booster comprising:

a booster shell having a partition plate mounted therein for partitioning an interior of the booster shell into a front shell chamber and a rear shell chamber;

a front booster piston provided to divide the front shell chamber into a fore-side front vacuum chamber and a back-side front working chamber;

a front diaphragm overlapped on a rear surface of the front booster piston;

a rear booster piston provided to divide the rear shell chamber into a fore-side rear vacuum chamber and a back-side rear working chamber;

a rear diaphragm overlapped on a rear surface of the rear booster piston;

a piston boss extending through a partition plate and connected to an output rod, said piston boss provided with a flange on a front portion thereof;

a valve cylinder continuously formed with a rear end of the piston boss and slidably supported by a rear wall of the booster shell;

an input rod disposed within the valve cylinder for advancing and retreating movements;

a control valve also disposed within the valve cylinder for placing the working chambers into alternate communication with an atmosphere and the respective vacuum chambers in response to advancing and retreating movements of the input rod;

a sleeve fitted over an outer periphery of the piston boss;

a front end of the sleeve and the flange clamping an inner peripheral end of the front booster piston and an inner peripheral bead of the front diaphragm, thereby air-tightly connecting the front booster piston and the front diaphragm to the front portion of the piston boss;

a bayonet means provided between the rear booster piston and the piston boss for coupling the rear booster piston to the piston boss, with the rear booster piston abutting against a rear end of the sleeve;

an engaging means provided between the rear booster piston and the piston boss for preventing a relative circumferential rotation between the rear booster piston and the piston boss in a condition where the bayonet means couples the rear booster piston to the piston boss; and a stopper member connected to the piston boss for clamping an inner peripheral bead of the rear diaphragm between itself and the piston boss, thereby air-tightly connecting the rear booster piston and the rear diaphragm to a rear portion of the piston boss;

a first port permitting the front and rear working chambers to communicate with the control valve;

a second port permitting the front and rear vacuum chambers to communicate with the control valve;

said first and second ports passing across a junction surface between the piston boss and the sleeve separately from each other at respective locations in front and rear of an annular sealing member disposed at said junction surface.

* * * * *